US011157756B2

(12) United States Patent
Arechiga Gonzalez et al.

(10) Patent No.: US 11,157,756 B2
(45) Date of Patent: Oct. 26, 2021

(54) SYSTEM AND METHOD FOR DETECTING ERRORS AND IMPROVING RELIABILITY OF PERCEPTION SYSTEMS USING LOGICAL SCAFFOLDS

(71) Applicant: Toyota Research Institute, Inc., Los Altos, CA (US)

(72) Inventors: Nikos Arechiga Gonzalez, San Mateo, CA (US); Soonho Kong, Arlington, MA (US); Jonathan DeCastro, Arlington, MA (US); Sagar Behere, Cupertino, CA (US); Dennis Park, Fremont, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 54 days.

(21) Appl. No.: 16/745,560

(22) Filed: Jan. 17, 2020

(65) Prior Publication Data
US 2021/0056321 A1 Feb. 25, 2021

Related U.S. Application Data

(60) Provisional application No. 62/888,658, filed on Aug. 19, 2019.

(51) Int. Cl.
*G06K 9/00* (2006.01)
*G06K 9/62* (2006.01)
(Continued)

(52) U.S. Cl.
CPC ....... *G06K 9/00805* (2013.01); *G06K 9/6256* (2013.01); *G06N 3/049* (2013.01); *G06N 3/08* (2013.01)

(58) Field of Classification Search
CPC .. G06K 9/00; G06K 9/62; G06K 9/46; G06K 9/48; G06K 9/66; G06K 9/03; G06K 9/20;
(Continued)

(56) References Cited

U.S. PATENT DOCUMENTS

| 2005/0131646 A1* | 6/2005 | Camus | G01S 3/7864 701/301 |
| 2012/0314071 A1* | 12/2012 | Rosenbaum | B60W 30/0956 348/148 |

(Continued)

OTHER PUBLICATIONS

Menzies & Pecheur, "Verification and Validation and Artificial Intelligence," Advances in Computers, vol. 65, 50 pages (2005).
(Continued)

*Primary Examiner* — Quan M Hua
(74) *Attorney, Agent, or Firm* — Christopher G. Darrow; Darrow Mustafa PC

(57) ABSTRACT

An artificial intelligence perception system for detecting one or more objects includes one or more processors, at least one sensor, and a memory device. The memory device includes an image capture module, an object identifying module, and a logical scaffold module. The image capture module and the object identifying module cause the one or more processors to obtain sensor information of a field of view from a sensor, identify an object within the sensor information, and determine at least one property of the object. The logical scaffold module causes the one or more processors to determine, by a logical scaffold, when the at least one property of the object as determined by the object identifying module is one of a true condition or a false condition.

20 Claims, 6 Drawing Sheets

(51) Int. Cl.
*G06N 3/08* (2006.01)
*G06N 3/04* (2006.01)

(58) Field of Classification Search
CPC .... G06K 9/32; G06T 7/00; G06T 7/20; G06T 7/246; G06T 7/262; G06T 7/11; G06T 7/254; G06T 7/73; G06T 11/20; G06T 7/13; G06T 7/40; G06T 7/521; G06T 7/70; G06T 1/00; G06T 19/00; G06T 3/40; G06T 7/215; G06F 3/0346
See application file for complete search history.

(56) References Cited

U.S. PATENT DOCUMENTS

| | | | | |
|---|---|---|---|---|
| 2014/0218516 | A1* | 8/2014 | Kim | G06K 9/00369 348/143 |
| 2015/0278585 | A1* | 10/2015 | Laksono | H04N 21/21805 382/103 |
| 2016/0050465 | A1* | 2/2016 | Zaheer | H04N 21/6581 725/34 |
| 2017/0316258 | A1* | 11/2017 | Hoy | G06K 9/00771 |

OTHER PUBLICATIONS

Kang et al. "Model Assertions for Debugging Machine Learning," Stanford Dawn Project, 9 pages (2018).

Gilpin et al., "Reasonable Perception: Connecting Vision and Language Systems for Validating Scene Descriptions," HRI18 Companion, Mar. 5-8, 2018, Chicago, IL, USA, 3 pages.

Dokhanchi et al., "Evaluating Perception Systems for Autonomous Vehicles using Quality Temporal Logic," 18th International Conference, RV 2018, Limassol, Cyprus, Nov. 10-13, 2018, Proceedings, 8 pages.

Dwyer et al., "Patterns in property specifications for finite-state verification," Proceedings of the 1999 International Conference on Software Engineering, 10 pages (1999).

Cancila et al., "Sharpening the Scythe of Technological Change: Socio-Technical Challenges of Autonomous and Adaptive Cyber-Physical Systems," Designs 2018, 2, 52, 19 pages (2018).

Kuwajima & Ishikawa, "Adapting SQaRE for Quality Assessment of Artificial Intelligence Systems," 6 pages, arXiv:1908.02134v1 [cs.CY] Jul. 31, 2019.

Czarnecki & Salay, "Towards a Framework to Manage Perceptual Uncertainty for Safe Automated Driving," 7 pages, arXiv:1903.03438v1 [cs.AI] Mar. 3, 2019.

* cited by examiner

SYSTEM AND METHOD FOR DETECTING ERRORS AND IMPROVING RELIABILITY OF PERCEPTION SYSTEMS USING LOGICAL SCAFFOLDS

CROSS-REFERENCE TO RELATED APPLICATION

This application claims priority to U.S. Provisional Patent Application No. 62/888,658 filed on Aug. 19, 2019, which is hereby incorporated by reference in its entirety.

TECHNICAL FIELD

The subject matter described herein relates, in general, to systems and methods for detecting errors and improving reliability of perception systems.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Recent progress in artificial intelligence ("AI") has led to possible deployment in a wide variety of domains. Current AI programs differ from traditional programs in their reliance on data. The specification, input-output semantics, and executable generation procedure are all data-driven.

Unlike traditional software development, in AI programs, a specification is not formally articulated. Indeed, in many of the most promising recent applications of AI, such as vision and human intent prediction, it is not feasible to write a formal specification. Instead, an implicit specification is provided via a test set, and the goal is to achieve a certain performance over the test set. Traditional software development specifies the input-output semantics of the program in a programming language. In AI programs, the engineer provides a training dataset, and the program must match the input-output statistics of the dataset.

As such, like other AI programs, AI perception systems, such as those used with automobiles and elsewhere, generally do not have a formal logic specification. Some of this is because one generally cannot define an object to be detected in a perception system by using the object itself. For example, suppose one is given a perception system that detects stop signs. One cannot use formal logic to express the property "if this image contains a stop sign, then the detector should flag a stop sign." The reason is that one cannot formally encode what it means for an image to contain a stop sign. If this were possible, there would be no need for neural-network-based perception systems.

Instead, the perception system utilizes a number of different algorithms, including artificial intelligence-based algorithms that are used to detect and classify objects based on images or other information provided to the perception system from one or more sensors. However, the algorithms used to detect and classify objects may make errors regarding both detection and/or classification of the objects.

SUMMARY

This section generally summarizes the disclosure and is not a comprehensive explanation of its full scope or all its features.

In one embodiment, an artificial intelligence perception system for detecting one or more objects includes one or more processors, at least one sensor, and a memory device. The memory device includes an image capture module, an object identifying module, and a logical scaffold module. The image capture module and the object identifying module cause the one or more processors to obtain sensor information of a field of view from a sensor, identify an object within the sensor information, and determine at least one property of the object. The logical scaffold module causes the one or more processors to determine, by a logical scaffold, when the at least one property of the object as determined by the object identifying module is one of a true condition or a false condition. The true condition may indicate that all the properties of the object as determined by the object identifying module satisfies a logical criterion, while the false condition indicates that the at least one property of the object as determined by the object identifying module fails the logical criterion.

In another embodiment, a method for detecting one or more objects by an artificial intelligence perception system includes the steps of obtaining sensor information of a field of view from a sensor, identifying, by the artificial intelligence perception system, an object within the sensor information, determining, by the artificial intelligence perception system, at least one property of the object based on the sensor information, and determining, by a logical scaffold, when the at least one property of the object as determined by the artificial intelligence perception system is one of a true condition or a false condition. The true condition may indicate that all the properties of the object as determined by object identifying module satisfies a logical criterion, while the false condition indicates that the at least one property of the object as determined by the object identifying module fails the logical criterion.

In yet another embodiment, a non-transitory computer-readable medium for detecting one or more objects by an artificial intelligence perception system includes instructions that when executed by one or more processors cause the one or more processors to obtain sensor information of a field of view from a sensor, identify, by the artificial intelligence perception system, an object within the sensor information, determine, by the artificial intelligence perception system, at least one property of the object based on the sensor information, and determine, by a logical scaffold, when the at least one property of the object as determined by the artificial intelligence perception system is one of a true condition or a false condition. The true condition may indicate that all the properties of the object as determined by object identifying module satisfies a logical criterion, while the false condition indicates that the at least one property of the object as determined by the object identifying module fails the logical criterion.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is an AI perception system that may be utilized in a vehicle. The AI perception system utilizes AI that has been trained to receive sensor information from one or more sensors, determines the presence of any objects within the sensor information, and determines one or more properties regarding the objects within the sensor information. These properties could include any one of a number of different things, such as the type of object, the velocity of the object, the relationship of the object with other objects, etc.

The AI perception system also utilizes a logical scaffold module that utilizes explicit logical specifications. The logical scaffold analyzes the properties determined by the AI perception system and determines if these properties are logical based on one or more criterion expressed in a logic, such as temporal logic. If the properties are not logical, the logical scaffold module can output an indicator indicating that the properties determined by the AI perception system are incorrect, allowing retraining of the AI perception system using the same or similar sensor information previously captured by the AI perception system.

Logical scaffolds may be lightweight formal properties that provide some information about the relationship of the program inputs and outputs. These logical scaffolds can be written in languages for which monitoring algorithms exist, such as Signal Temporal Logic, Signal Convolutional Logic, Timed Quality Temporal Logic, and many others. Logical scaffolds may arise from a number of different sources, including a formalization of physical laws, domain knowledge, and common sense. The logical scaffolds may be more general than reasonableness monitors and model assertions because logical scaffolds can be used for different types of AI programs beyond perception.

Figure 1:
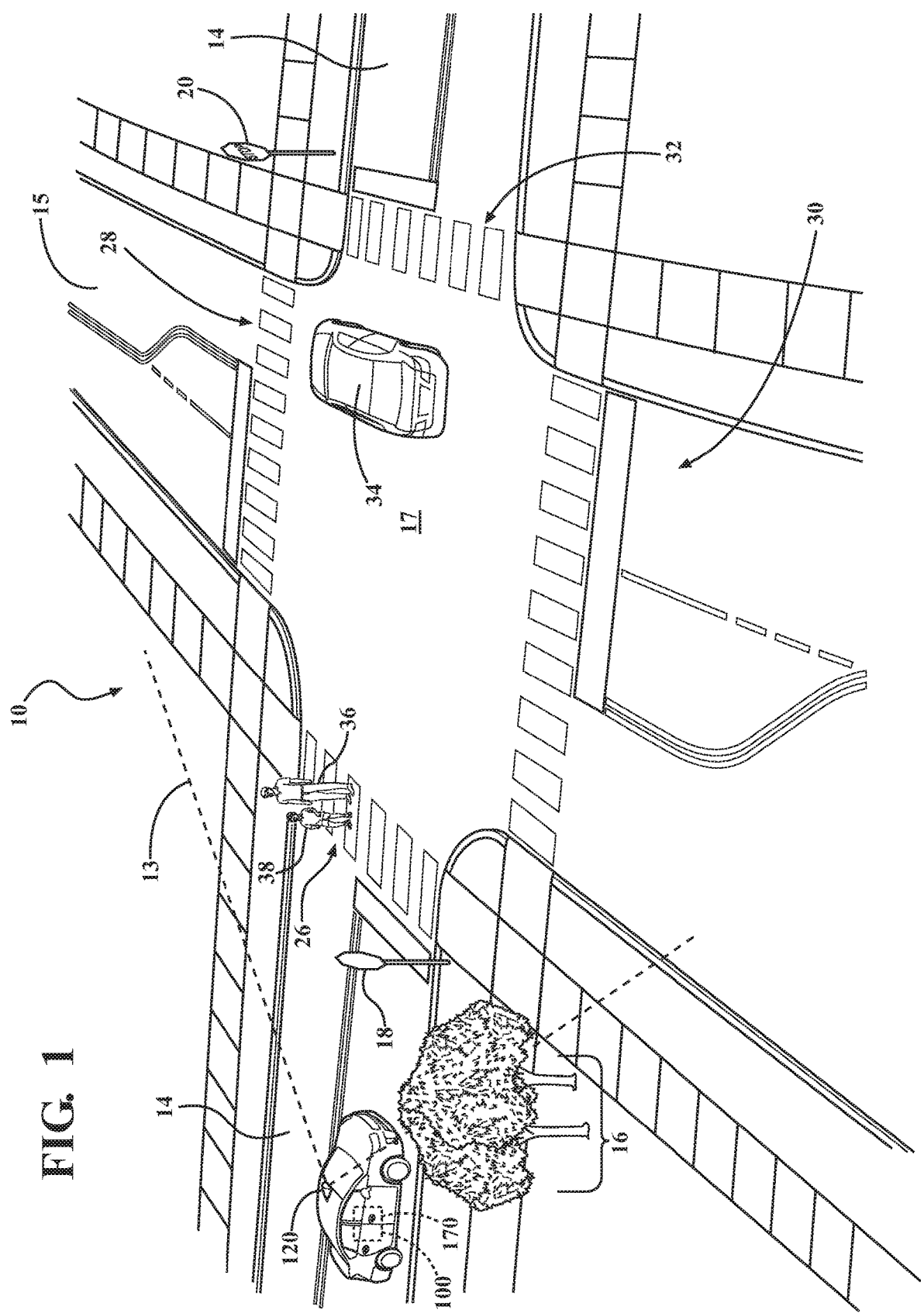
FIG. 1 illustrates an example of an environment having a vehicle that includes the AI perception system that utilizes one or more logical scaffolds.

Referring to FIG. 1, an example environment 10 in which a vehicle 100 having an AI perception system 170 is shown. It should be understood that the example environment 10 is just one type of environment in which a vehicle 100 having the AI perception system 170 may operate within. The purpose of describing the environment 10 is to provide an example of how logical scaffolds can be utilized by the AI perception system 170.

In this example, the vehicle 100 is traveling down a road 14. The road 14 includes an intersection 17 that intersects the road 14 with another road 15. In this example, the intersection 17 is a two way stop, wherein vehicles traveling along the road 14 are required to stop at the intersection 17. A pair of stops signs 18, 20 may be located near the intersection 17 so as to indicate the need for vehicles approaching the intersection 17 along the road 14 to stop at the intersection 17, thus giving vehicles approaching the intersection 17 from the road 15 the right of way.

Near the intersection 17 are crosswalks 26, 28, 30, and 32 that allow pedestrians, bicyclists, and the like to cross the roads 14 and/or 15 in a relatively safe manner. Crosswalks 26 and 32 extend across the road 14, while crosswalks 28 and 30 extend across the road 15. In this example, pedestrians 36 and 38 are crossing the crosswalk 28. The environment 10 also includes another vehicle 34 that is traveling along the road 15. In this example, the vehicle 34 is located within the intersection 17. Finally, the environment 10 also includes one or more trees 16 that are located near the stop sign 18.

The vehicle 100 with the AI perception system 170 includes a sensor system 120 that may include any one of a number of different sensors. A more detailed description of the vehicle 100, the sensor system 120, and the AI perception system 170 will be given later in this specification. In this example, the sensor system 120 includes a sensor that has a field-of-view 13 that generally includes the trees 16, the stop signs 18 and 20, the pedestrians 36 and 38, and the vehicle 34.

In general, the AI perception system 170 is able to utilize information generated by the sensor system 120 to determine the presence of any objects within the field-of-view 13, including the trees 16, the pedestrians 36 and 38, the stop sign 18, and the vehicle 34. In addition to determining the presence of objects, the AI perception system 170 is also able to determine properties regarding the objects. These properties will be described later in this specification but could include information regarding a category of the object (pedestrian, bicycle, vehicle, sign, tree, etc.), a velocity of the object, and location of the object.

The AI perception system 170 may be a trained artificial intelligence system. In one example, the AI perception system 170 may be trained using a variety of training sets, sometimes referred to as training data. The training data can be data that was captured by a sensor system, such as the sensor system 120 and annotated to train the AI perception system 170. However, the training of an artificial intelligence system, such as the AI perception system 170 generally utilizes implicit specifications.

The AI perception system 170 may also utilize logical scaffolds that may be incorporated into the AI perception system 170 as a logical scaffold module, which will be described in greater detail later in this specification. The purpose of the logical scaffolds for the AI perception system 170 is to add a list of logical requirements. For example, the AI perception system 170 may determine that the pedestrians 36 and 38 are traveling at a speed of approximately 2 mph, the vehicle 34 is traveling at 30 mph, and that the stop signs 18, 20, and trees 16 are not moving at all. In this example, the logical scaffolds agree with the properties determined by the AI perception system 170.

However, if the AI perception system 170 determines that the stop sign 18 was traveling at 30 mph or the pedestrians 36 or 38 are traveling at 70 mph, the logical scaffolds would flag this as a mistake determined by the AI perception system 170, as pedestrians cannot travel at 70 mph and trees and signs should not be moving. As such, the logical scaffolds add a form of explicit specifications to the AI perception system 170. Once a mistake has been flagged, the data collected by the sensor system 120 can be evaluated and can be used to retrain the AI perception system 170 so as to create a more reliable AI perception system 170. The logical scaffolds may be used during the training of the AI perception system 170 or can be utilized during the run time of the AI perception system 170.

Figure 2:
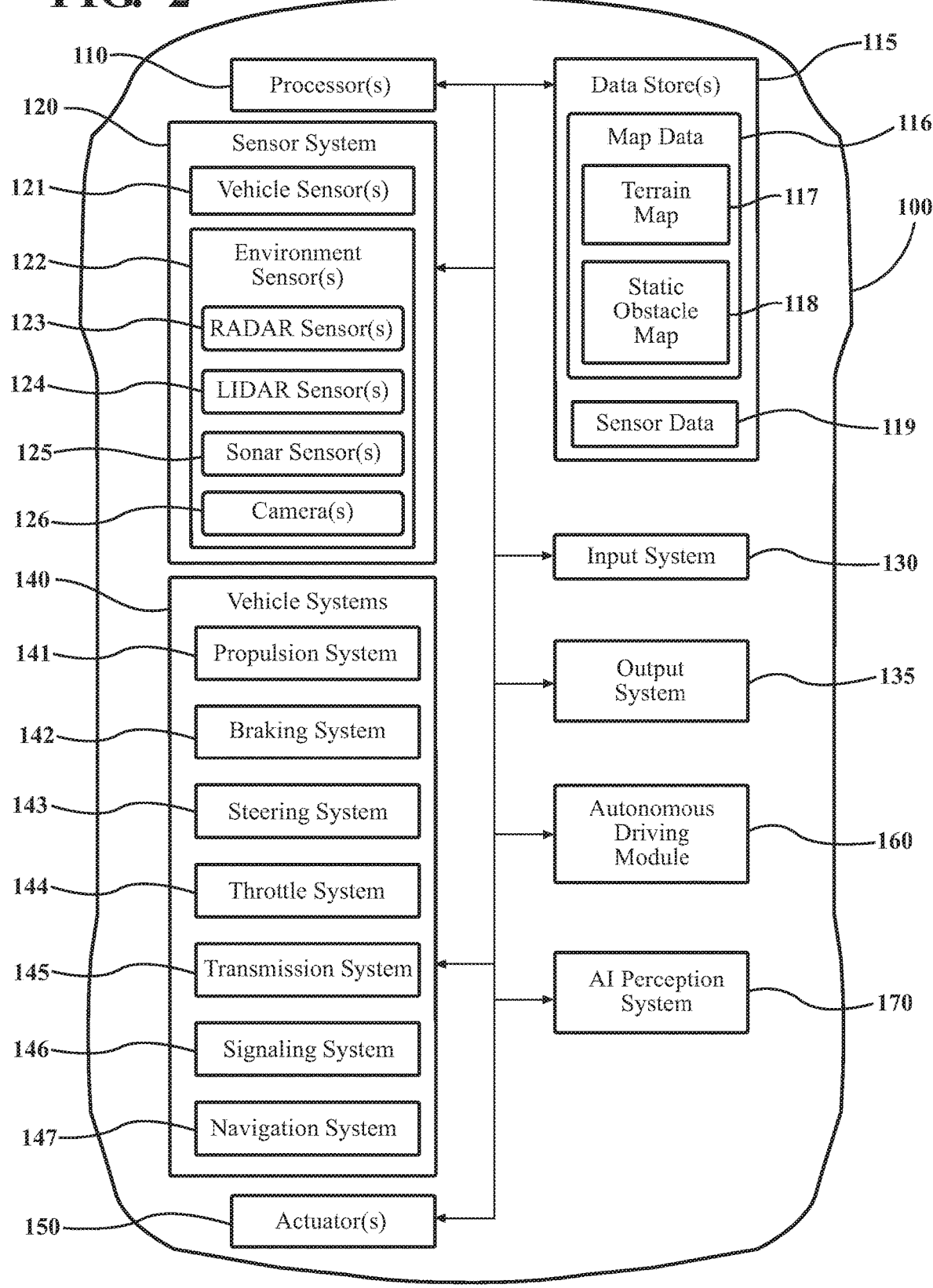
FIG. 2 illustrates a more detailed view of the vehicle that includes the AI perception system that utilizes one or more logical scaffolds.
Figure 3:
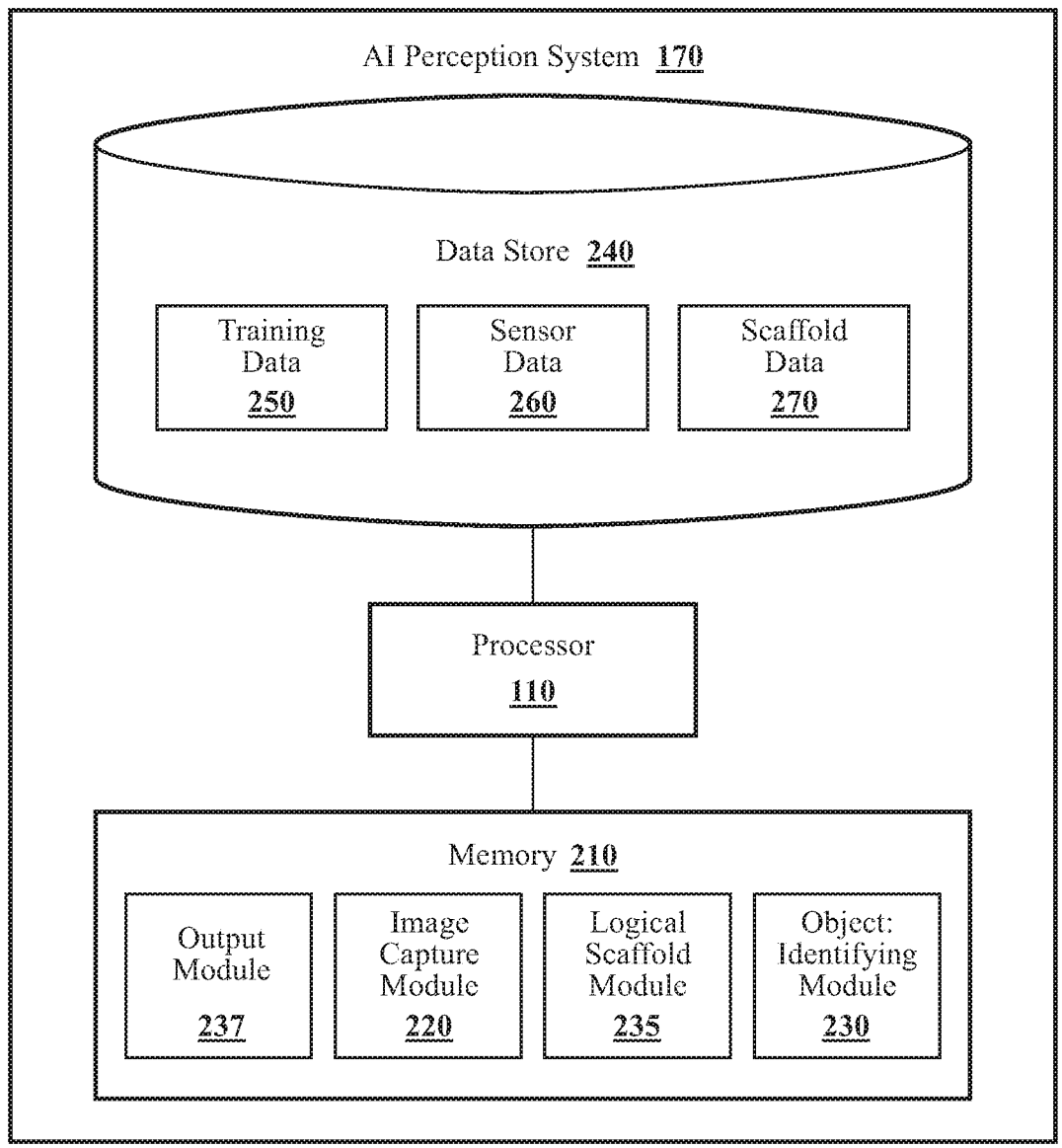
FIG. 3 illustrates a more detailed view of the AI perception system that utilizes one or more logical scaffolds.

Referring to FIG. 2, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control as discussed in relation to the autonomous driving module(s) 160.

The vehicle 100 also includes various elements. It will be understood that in various embodiments it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 2 will be provided after the discussion of FIGS. 1 and 3-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes the AI perception system 170. The AI perception system 170 may be incorporated within the autonomous driving module(s) 160 or may be separate, as shown. The AI perception system 170 may, as will be explained in greater detail later in this specification, receive sensor information from the sensor system 120, determine the presence of any objects within information from the sensor system 120, categorize any identified objects, and then utilize logical scaffolds to determine if the previous determinations regarding the presence of the objects and/or the category of the objects is correct.

With reference to FIG. 2, one embodiment of the AI perception system 170 is further illustrated. As shown, the AI perception system 170 includes a processor 110. Accordingly, the processor 110 may be a part of the AI perception system 170 or the AI perception system 170 may access the processor 110 through a data bus or another communication path. In one or more embodiments, the processor 110 is an application-specific integrated circuit that is configured to implement functions associated with an image capture module 220, an object identifying module 230, a logical scaffold module 235, and an output module 237.

In general, the processor 110 is an electronic processor such as a microprocessor that is capable of performing various functions as described herein. In one embodiment, the AI perception system 170 includes a memory 210 that stores the image capture module 220, the object identifying module 230, the logical scaffold module 235, and the output module 237. The memory 210 is a random-access memory (RAM), read-only memory (ROM), a hard disk drive, a flash memory, or other suitable memory for storing the modules 220 and 230. The modules 220, 230, 235, and 237 are, for example, computer-readable instructions that, when executed by the processor 110, cause the processor 110 to perform the various functions disclosed herein.

Furthermore, in one embodiment, the AI perception system 170 includes a data store 240. The data store 240 is, in one embodiment, an electronic data structure such as a database that is stored in the memory 210 or another memory and that is configured with routines that can be executed by the processor 110 for analyzing stored data, providing stored data, organizing stored data, and so on. Thus, in one embodiment, the data store 240 stores data used by the modules 220, 230, 235, and 237 in executing various functions. In one embodiment, the data store 240 includes training data 250 that may include data used to train the AI perception system 170, sensor data 260 that may include sensor data captured by the sensor system 120, and scaffold data 270 that may include one or more logical scaffolds written in one or more logic-based languages, such as Signal Temporal Logic, Signal Convolutional Logic, Timed Quality Temporal Logic and many others. These languages differ from traditional languages in that they allow for specifying timed properties of real-valued (or continuous) signals.

Accordingly, the image capture module 220 may include instructions that cause the processor 110 to obtain information from one or more sensors that form the sensor system 120. In one example, information received from the sensor system may be in the form of one or more images captured by the camera 126 of the sensor system 120 of a field-of-view of the environment in which the vehicle 100 operates. Of course, it should be understood that in lieu of images from the camera 126, other information could be utilized as well such as information from the radar sensors 123, the sonar sensors 125, and the LIDAR sensors 124.

The object identifying module 230 includes instructions that, when executed by the processor 110, causes the processor 110 to identify an object within the sensor information and determine a property of the object based on the sensor information. The properties of the object that may be determined by the object identifying module 230 may include any one of a number of different properties. For example, the properties could include temporal properties, ontological properties, and/or a relationship related property.

With regards to ontological properties, these properties may include the motion of the object, the velocity of the object, the location of the object, and/or a transition of the object from one type of object to another type of object. For example, the object identifying module 230 could determine that the pedestrians 36 and 38 of FIG. 1 are indeed pedestrians. Additionally, the object identifying module 230 could also determine certain properties regarding the pedestrians 36 and 38, such as the motion, velocity, and location of the pedestrians 36 and 38. Furthermore, the system can determine if the pedestrians 36 and 38 transitions from one type of object to another. For example, the object identify module 230 can determine if the object changes from being a pedestrian to a street sign, such as the stop sign 18.

With regards to temporal properties, the temporal properties may include the amount of time that the object is within the sensor information and the consistency of the object within the sensor information. In one example, the temporal properties determined by the object identify module 230 could include the amount of time that the pedestrians 36 and/or 38 are located within the sensor information and if they are consistently within the sensor information. Consistency within the sensor information could include if the pedestrians 36 and/or 38 suddenly disappear from the sensor information and/or suddenly reappear in the sensor information.

With regard to relationship-related properties, these properties could include the spatial relationship between the objects in another object. For example, the object identifying module 230 could determine the distances of the pedestrians 36 and/or 38 to a number of different objects, such as the trees 16, the vehicle 34, and other objects.

The logical scaffold module 235 includes instructions that cause the processor 110 to determine when the property of the object, as determined by the object identifying module 230, is either a true condition or a false condition. As stated before, the logical scaffold module 235 may utilize scaffold data 270 that was written in temporal logic, such as Signal Temporal Logic, Signal Convolutional Logic, Timed Quality Temporal Logic and many others. These languages differ from traditional languages in that they allow for specifying timed properties of real-valued (or continuous) signals.

As such, the scaffold data 270 may include any one of a number of different logical scaffolds that include certain discrete requirements written in the previously mentioned languages. For example, the scaffold data 270 could include information regarding pedestrians, such as pedestrians 36 and 38 of FIG. 1. In one example, the scaffold data 270 could include general requirements that the pedestrians have a velocity between 0 mph and 25 mph. With regards to other objects, such as the trees 16 and the stop signs 18 and 20, the scaffold data 270 could include requirements that the velocity of these objects be 0 mph. With regards to the vehicle 34, logical scaffolds could include requirements that the velocity is between 0 mph and 150 mph in further requirements that the vehicle 34 be traveling on a roadway, such as the road 14 and/or 16.

Again, these are just examples of some of the logical scaffolds that could be developed. These logical scaffolds may be based on physical properties, such as that trees and stop signs are fixed and do not move, but other properties as well, such as common sense. As such, the logical scaffolds provide discrete requirements so as to prevent and/or detect when the AI perception system 170 detects and/or categorizes any objects detected in a way that defies the requirements of the logical scaffolds.

In the event that the logical scaffold module 235 determines that the AI perception system 170 has detected and/or categorized an object in a way that defies one of the logical scaffolds stored within the scaffold data 270, the logical scaffold module 235 causes the processor 110 to output of a false condition. Conversely, if the detection and/or categorization of the object satisfies the logical scaffolds, the logical scaffold module 235 causes the processor 110 to output a true condition. The outputting of the true condition or false condition may be performed by the output module 237 which may include instructions that cause the processor 110 to output either true condition or false condition based on the determination made by the logical scaffold module 235.

In the event that a false condition is outputted by the output module 237, any one of a number of different actions may be performed. In one example, the output module 237 also includes instructions that cause the processor 110 to provide some further information regarding the information from the sensor system 120 that was fed into the object identifying module 230 that eventually caused the false condition. In one example, the output module 237 could cause the processor 110 to store the information from the sensor system 120 that resulted in the false condition in the sensor data 260. By so doing, this information can be utilized to retrain the AI perception system 170 so that the AI perception system 170 next time correctly detects and/or categorizes the object in the stored sensor data. The information from the sensor system 120 may be one or more images that were captured by the camera 126 but could also include other information captured from the other environment sensors 122, such as the radar sensors 123, the LIDAR sensors 124, and/or the sonar sensors 125.

Figure 4:
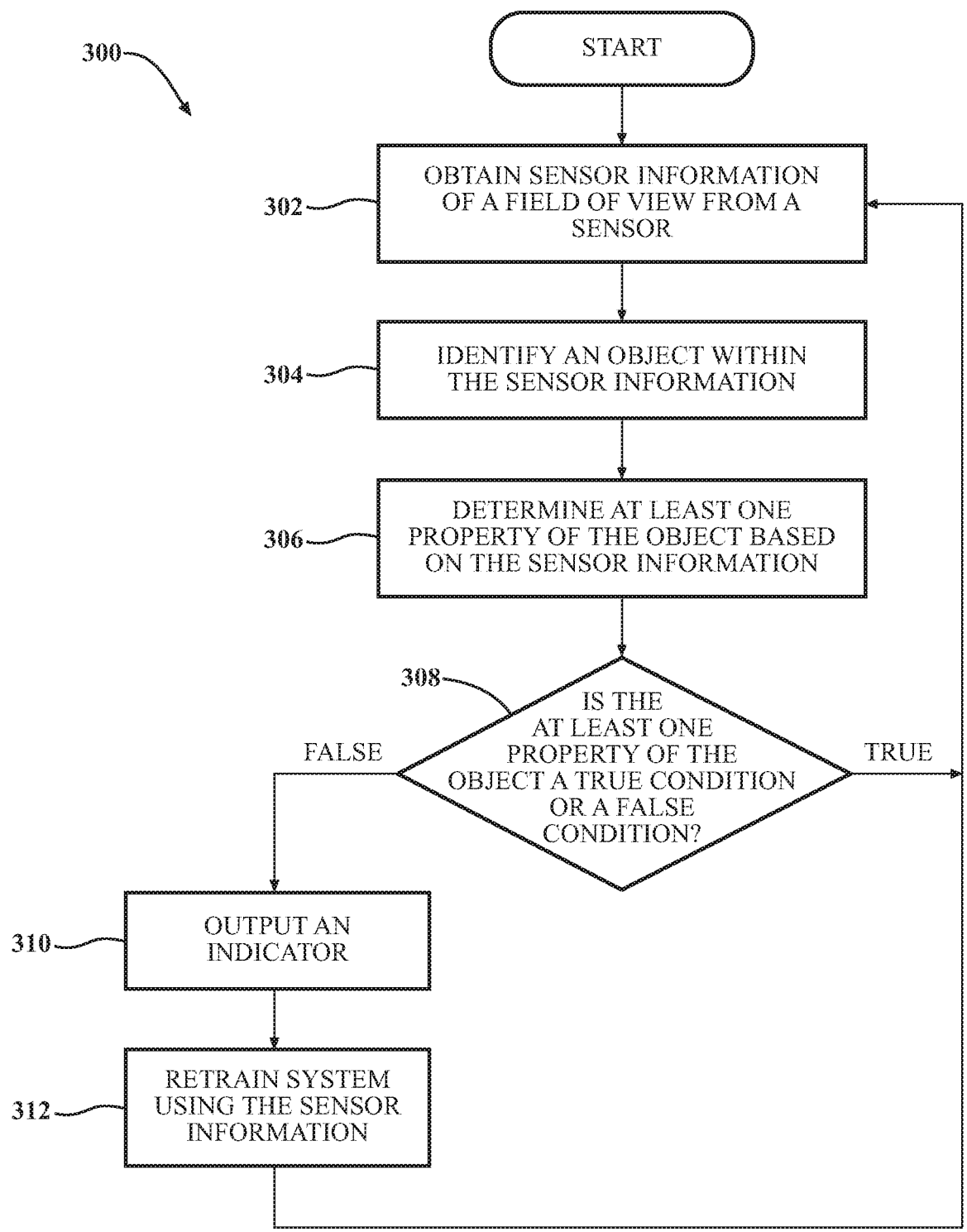
FIG. 4 illustrates a method for utilizing one or more logical scaffolds by an AI perception system.

Referring to FIG. 4, a method 300 for detecting one or more objects by an AI perception system, such as the AI perception system 170, is shown. The method 300 will be described from the viewpoint of the vehicle 100 of FIG. 2 and the AI perception system 170 of FIG. 3. However, it should be understood that this is just one example of implementing the method 300. While method 300 is discussed in combination with the AI perception system 170, it should be appreciated that the method 300 is not limited to being implemented within the AI perception system 170 but is instead one example of a system that may implement the method 300.

The method 300 begins at step 302, wherein the image capture module 220 causes the processor 110 to obtain sensor information of a field-of-view from a sensor. In one example, the sensor information could include information from any of the sensors making up the sensor system 120. In one example, the sensor information could be from the environment sensors 122, such as the radar sensor 123, the LIDAR sensor 124, the sonar sensor 125, the camera 126, or combinations thereof.

In step 304, the object identifying module 230 causes the processor 110 to identify an object within the sensor information. For example, the object identifying module 230 may include instructions that are able to process the sensor information to determine the presence of any objects. These objects could include any of the objects previously described in FIG. 1, such as the tree 16, the stop signs 18 and 20, the vehicle 34, and/or the pedestrians 36 and 38. However, it should be understood that the objects detected by the object identifying module 230 could include any one of a number of different objects or any type of object present in the environment in which the AI perception system 170 is operating within.

In step 306, the object identifying module 230 causes the processor 110 to determine at least one property of the object based on the sensor information. The properties of the object that may be determined by the object identifying module 230 may include any one of a number of different properties. For example, the properties could include temporal properties, ontological properties, and/or a relationship related property.

With regards to ontological properties, these properties may include the motion of the object, the velocity of the object, the location of the object, and/or a transition of the object from one type of object to another type of object. For example, the object identifying module 230 could determine that the pedestrians 36 and 38 of FIG. 1 are indeed pedestrians. Additionally, the object identifying module 230 could also determine certain properties regarding the pedestrians 36 and 38, such as the motion, velocity, and location of the object. Furthermore, the system can determine if the object transitions from one type of object to another. For example, the object identify module 230 can determine if the object changes from being a pedestrian to a street sign, such as the stop sign 18. Another example could include a situation where a transition is allowed, such as when a pedestrian mounts a bicycle.

With regards to temporal properties, the temporal properties may include the amount of time that the object is within the sensor information in the consistency of the object within the sensor information. In one example, the temporal properties determined by the object identify module 230 could include the amount of time that the pedestrians 36 and/or 38 are located within the sensor information and if they are consistently within the sensor information. Consistency within the sensor information could include if the pedestrians 36 and/or 38 suddenly disappear from the sensor information and/or suddenly reappear in the sensor information. Another example of a temporal property would be how quickly and often a biker transitions to a pedestrian and vice versa. Changing from pedestrian to biker to pedestrian to biker very fast is not realistic.

With regard to relationship-related properties, these properties could include the spatial relationship between the objects in another object. For example, the object identifying module 230 could determine the distances of the pedestrians 36 and/or 38 to a number of different objects, such as the trees 16, the vehicle 34, and other objects. Another example could include a situation where crosswalk should not end in the middle of the road.

In step 308, the logical scaffolds module 235 causes the processor 110 to determine if one of the properties of the object, as determined by the object identifying module 230, is a true condition or a false condition. As stated before, the logical scaffold module 235 may utilize scaffold data 270 that was written in temporal logic, such as Signal Temporal Logic, Signal Convolutional Logic, Timed Quality Temporal Logic and many others. These languages differ from traditional languages in that they allow for specifying timed properties of real-valued (or continuous) signals.

As such, the scaffold data 270 may include any one of a number of different logical scaffolds that include certain discrete requirements written in the previously mentioned languages. For example, the scaffold data 270 could include information regarding pedestrians, such as pedestrians 36 and 38 of FIG. 1. In one example, the scaffold data 270 could include general requirements that the pedestrians have a velocity between 0 mph and 25 mph. With regards to other objects, such as the trees 16 and the stop signs 18 and 20, the scaffold data 270 could include requirements that the velocity of these objects be 0 mph. With regards to the vehicle 34, logical scaffolds could include requirements that the velocity is between 0 mph and 150 mph in further requirements that the vehicle 34 be traveling on a roadway, such as the road 14 and/or 16.

Again, these are just examples of some of the logical scaffolds that could be developed. These logical scaffolds may be based on physical properties, such as that trees and stop signs are fixed and do not move, but other properties as well, such as common sense. As such, the logical scaffolds provide discrete requirements so as to prevent and/or detect when the AI perception system 170 detects and/or categorizes any objects detected in a way that defies the requirements of the logical scaffolds.

If it is determined in step 308 that the property, as determined by the object identify module 230 is a true condition, the method 300 returns to step 302. In the event that it is determined that the property, as determined by the object identifying module 230, is a false condition, the method 300 proceeds to step 310. In step 310, the output module 237 may cause the processor 110 to output an indicator indicating that a false condition has been determined. In such a case, the output module 237 may cause the processor 110 to store the sensor information that caused the false condition to occur. The sensor information may be stored within the sensor data 260.

In step 312, the output module 237 may cause the processor 110 to retrain the AI perception system 170 using the sensor information that causes the false condition to occur. As such, the training data 250 may be updated to include the sensor information which may be annotated and then used to train the AI perception system 170 with the expectation that the AI perception system 170 will not make the same or similar mistakes again.

With regard to training the AI perception system 170, special note should be made regarding the use of logical scaffolds. The logical scaffolds, such as those stored within the scaffold data 270, may be used to train the AI perception system 170, while the AI perception system 170 is not deployed in the field. For example, while the AI perception system 170 is being trained by images, the logical scaffold module 235 can cause the processor 110 to continuously monitor the determinations made by the AI perception system 170 while it is being trained. In the event that the AI perception system 170 incorrectly determines the presence of an object and/or certain properties of an object as specified by one or more logical scaffolds stored within the scaffold data 270, the sensor information used to train the AI perception system 170 that caused a false condition to rise, can be used to retrain the AI perception system 170.

As such, the logical scaffolds stored in the scaffold data 270 can be used in a runtime environment, i.e., when the AI perception system 170 is deployed or can be utilized while the AI perception system 170 is being trained.

Figure 5:
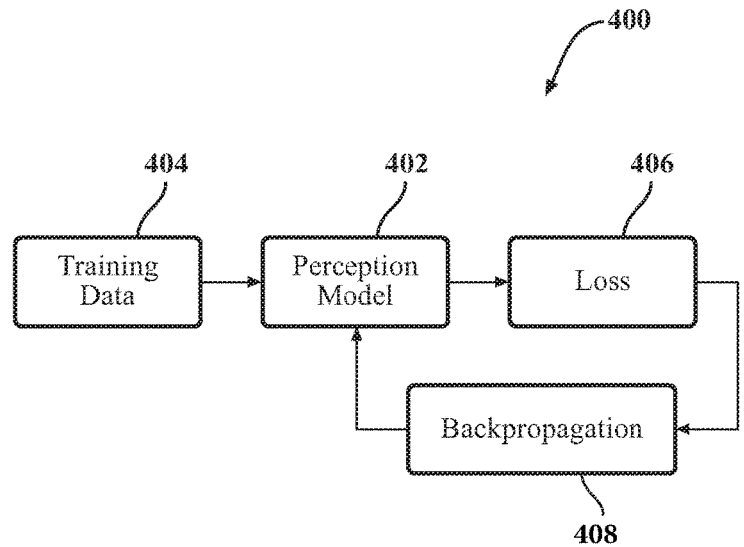
FIGS. 5-7 illustrate flow diagrams of different ways of training and AI perception system utilizing one or more logical scaffolds.

Referring to FIG. 5, a flow diagram 400 illustrates one way of training a perception model 402, similar to the AI perception system 170. Here, the flow diagram 400 begins with training data 404 that is used to train the perception model 402. Logical scaffolds can be utilized as a way to determine if there is a violation of the specification. When there is a violation of the specification, a penalty may be applied to the loss function 406 During the training of the perception model 402, as opposed to waiting for the perception model 402 to be deployed. Backpropagation 408 can then compute the gradient of the loss function with respect to the weights of the network.

Figure 6:
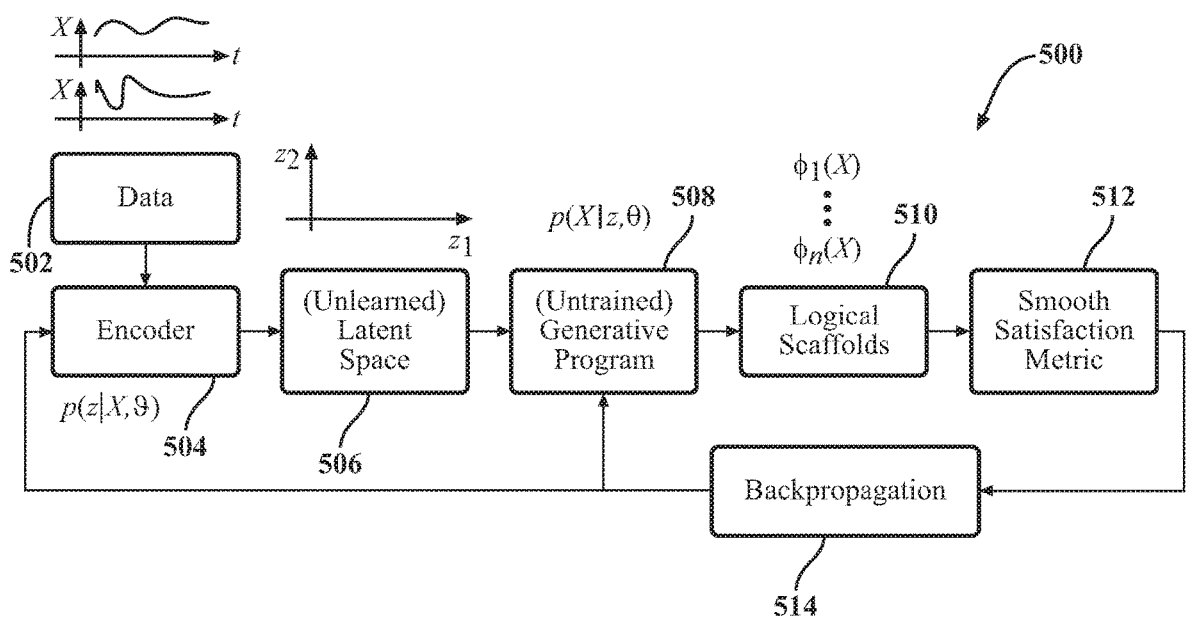

FIG. 6 illustrates a flow diagram 500 for training a latent space utilizing logical scaffolds. Here, data 502 is fed into an encoder 504, which is then provided to an unlearned latent space 506. This information is, in turn, provided to an untrained generative program 508. The logical scaffolds 510 are able to determine if the generative program is making appropriate decisions based on the specifications written in temporal logic that form the logical scaffolds 510. From there, a smooth satisfaction metric 512 can be determined in backpropagation 514 can be performed.

Figure 7:
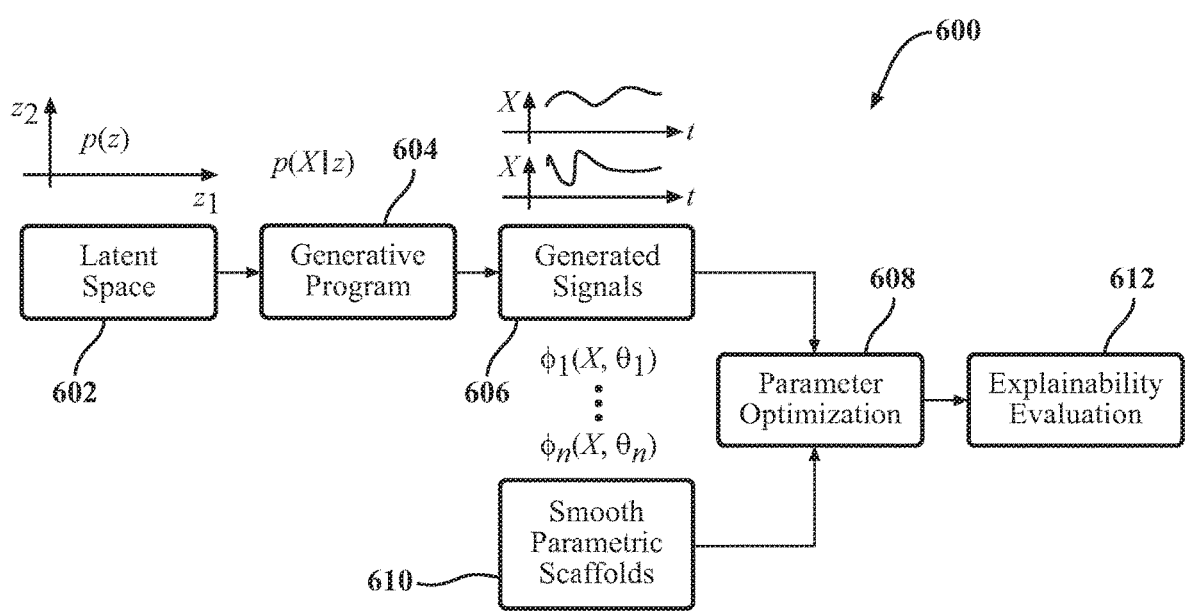

FIG. 7 illustrates a flow diagram 600 that allows for learning explanations of pre-trained generative models while utilizing logical scaffolds. Here, the latent space 602 provides data to the generative program 604, which in turn generates signals 606. The generated signals 606 are provided to a parameter optimization module 608. The parameter optimization module also receives a smooth parametric scaffold 610. From there, the parameter optimization module 608 is able to generate and explainability evaluation 612 which can explain and provide some evaluation of the generative program 604.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the AI perception system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect and/or sense something. The one or more sensors can be configured to detect and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the AI perception system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the AI perception system 170, and/or the autonomous driving module(s) 160 may control some or all of these vehicle systems 140 and, thus, may be partially or fully autonomous.

The processor(s) 110, the AI perception system 170, and/or the autonomous driving module(s) 160 can be operatively connected to communicate with the various vehicle systems 140 and/or individual components thereof. For example, returning to FIG. 1, the processor(s) 110, the AI perception system 170, and/or the autonomous driving module(s) 160 can be in communication to send and/or receive information from the various vehicle systems 140 to control the movement, speed, maneuvering, heading, direction, etc. of the vehicle 100. The processor(s) 110, the AI perception system 170, and/or the autonomous driving module(s) 160 may control some or all of these vehicle systems 140.

The processor(s) 110, the AI perception system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the AI perception system 170, and/or the autonomous driving module(s) 160 can control the direction and/or speed of the vehicle 100. The processor(s) 110, the AI perception system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving module(s) 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models.

The autonomous driving module(s) 160 either independently or in combination with the AI perception system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims rather than to the foregoing specification, as indicating the scope hereof.

What is claimed is:

1. An artificial intelligence perception system for detecting one or more objects comprising:
    one or more processors;
    at least one sensor operably connected to the one or more processors, the at least one sensor having a field of view of an environment; and
    a memory device operably connected to the one or more processors, the memory device comprising:
        an image capture module having instructions that when executed by the one or more processors causes the one or more processors to obtain sensor information of the field of view from the at least one sensor,
        an object identifying module having instructions that when executed by the one or more processors causes the one or more processors to identify, using a trained perception model, an object within the sensor information and determine at least one property of the object based on the sensor information, and
        a logical scaffold module having instructions that when executed by the one or more processors causes the one or more processors to determine when the at least one property of the object as determined by trained perception model is one of a true condition or a false condition, wherein the true condition indicates that the at least one property of the object as determined by the trained perception model satisfies a logical criterion, indicating that the at least one property of the object is correct based on a discrete requirement stored in a data store, and the false condition indicates that the at least one property of the object as determined by the trained perception model fails the logical criterion, indicating that the at least one property of the object is incorrect based on the discrete requirement.

2. The artificial intelligence perception system of claim 1, wherein the at least one property of the object as determined by the trained perception model includes at least one of a temporal property, an ontological property, and a relationship related property.

3. The artificial intelligence perception system of claim 2, wherein the ontological property of the object includes at least one of a motion of the object, a velocity of the object, a location of the object, a transition of an object from one type of object to another type of object.

4. The artificial intelligence perception system of claim 2, wherein the temporal property of the object includes at least one of a time the object is within the sensor information and a consistency of the object within the sensor information.

5. The artificial intelligence perception system of claim 2, wherein the relationship related property of the object includes a spatial relationship between the object and another object.

6. The artificial intelligence perception system of claim 1, wherein the memory device further comprises an output module having instructions that when executed by the one or more processors causes the one or more processors to output an indicator when the at least one property of the object as determined by the trained perception model fails the logical criterion, wherein the indicator includes the sensor information used to determine the at least one property of the object.

7. A method for detecting one or more objects by an artificial intelligence perception system, the method comprising the steps of:
    obtaining sensor information of a field of view from a sensor;
    identifying, by the artificial intelligence perception system, an object within the sensor information;
    determining, by the artificial intelligence perception system using a trained perception model, at least one property of the object based on the sensor information;
    determining, by a logical scaffold, when the at least one property of the object as determined by the trained perception model is one of a true condition or a false condition; and
    wherein the true condition indicates that the at least one property of the object as determined by the artificial intelligence perception system satisfies a logical criterion, indicating that the at least one property of the object is correct based on a discrete requirement stored in a data store, and the false condition indicates that the at least one property of the object as determined by the trained perception model fails the logical criterion indicating that the at least one property of the object is incorrect based on the discrete requirement.

8. The method of claim 7, wherein the at least one property of the object as determined by the trained perception model includes at least one of a temporal property, an ontological property, and a relationship related property.

9. The method of claim 8, wherein the ontological property of the object includes at least one of a motion of the object, a velocity of the object, a location of the object, a transition of an object from one type of object to another type of object.

10. The method of claim 8, wherein the temporal property of the object includes at least one of a time the object is within the sensor information and a consistency of the object within the sensor information.

11. The method of claim 8, wherein the relationship related property of the object includes a spatial relationship between the object and another object.

12. The method of claim 7, further comprising the steps of outputting an indicator when the at least one property of the object as determined by the trained perception model fails the logical criterion, wherein the indicator includes the sensor information used to determine the at least one property of the object.

13. The method of claim 12, further comprising the step of retraining the trained perception model using the sensor information that resulted in the false condition.

14. The method of claim 7, wherein the logical scaffold is written in temporal logic.

15. A non-transitory computer-readable medium for detecting one or more objects by an artificial intelligence perception system, the non-transitory computer-readable medium comprising instructions that when executed by one or more processors cause the one or more processors to:
obtain sensor information of a field of view from a sensor;
identify, by the artificial intelligence perception system using a trained perception model, an object within the sensor information;
determine, by the trained perception model, at least one property of the object based on the sensor information;
determine, by a logical scaffold, when the at least one property of the object as determined by the trained perception model is one of a true condition or a false condition; and
wherein the true condition indicates that the at least one property of the object as determined by the trained perception model satisfies a logical criterion, indicating that the at least one property of the object is correct based on a discrete requirement stored in a data store, and the false condition indicates that the at least one property of the object as determined by the trained perception model fails the logical criterion indicating that the at least one property of the object is incorrect based on the discrete requirement.

16. The non-transitory computer-readable medium of claim 15, wherein the at least one property of the object as determined by the trained perception model includes at least one of a temporal property, an ontological property, and a relationship related property.

17. The non-transitory computer-readable medium of claim 16, wherein the ontological property of the object includes at least one of a motion of the object, a velocity of the object, a location of the object, a transition of an object from one type of object to another type of object.

18. The non-transitory computer-readable medium of claim 16, wherein the temporal property of the object includes at least one of a time the object is within the sensor information and a consistency of the object within the sensor information.

19. The non-transitory computer-readable medium of claim 16, wherein the relationship related property of the object includes a spatial relationship between the object and another object.

20. The non-transitory computer-readable medium of claim 15, further comprising instructions that when executed by one or more processors cause the one or more processors to output an indicator when the at least one property of the object as determined by the trained perception model fails the logical criterion, wherein the indicator includes the sensor information used to determine the at least one property of the object.

* * * * *